United States Patent [19]

Hehl

[11] 4,293,229
[45] Oct. 6, 1981

[54] HYDRAULIC CONTROLS FOR INJECTION UNIT OF INJECTION MOLDING MACHINE

[76] Inventor: Karl Hehl, Arthur-Hehl-Strasse, 7298 Lossburg 1, Fed. Rep. of Germany

[21] Appl. No.: 140,615

[22] Filed: Apr. 15, 1980

[51] Int. Cl.³ .............................................. B29B 1/06
[52] U.S. Cl. ...................................... 366/78; 60/445; 366/333
[58] Field of Search ...................... 366/76, 78, 79, 332, 366/333, 334, 335; 425/207, 208, 209; 100/145; 60/445

[56] References Cited

U.S. PATENT DOCUMENTS

| | | | |
|---|---|---|---|
| 3,833,204 | 9/1974 | Hehl | 366/76 |
| 3,887,170 | 6/1975 | Heindi | 366/78 |
| 3,921,963 | 11/1975 | Neff | 366/78 |
| 3,945,620 | 3/1976 | Ruegg | 366/78 |
| 3,951,388 | 4/1976 | Schrammel | 366/78 |
| 4,020,633 | 5/1977 | Hehl | 60/445 |

Primary Examiner—Robert W. Jenkins
Attorney, Agent, or Firm—Joseph A. Geiger

[57] ABSTRACT

Hydraulic controls for the injection unit of an injection molding machine of the type which has tandem supporting bridges riding on two guide rods and hydraulic cylinder assemblies surrounding the rods, the cylinder assemblies in the rear supporting bridge which control the movements of the plastification screw being convertible from single-acting cylinders to double-acting cylinders with a differential piston, for the selective connection to a first hydraulic control system which has presettable proportional-response control valves for the adjustment of the pressure and flow rate of the hydraulic fluid, or to a second hydraulic control system which provides a continuous electronic control input to a servo-valve, adjusted by an electronic feedback loop with pressure transducers. The conversion involves the exchange of a piston and a cylinder cover in the two cylinder assemblies of the rear supporting bridge.

7 Claims, 6 Drawing Figures

HYDRAULIC CONTROLS FOR INJECTION UNIT OF INJECTION MOLDING MACHINE

BACKGROUND OF THE INVENTION

1. Field of the Invention

The present invention relates to injection molding machines which process plastic materials, and, more particularly, to the hydraulic controls for injection units of injection molding machines which serve to plastify plastic raw material and to inject it under pressure into an injection molding die.

3. Description of the Prior Art

For the production of high quality injection-molded parts with minimal variations in size and weight, it is important that the operation of the injection unit be controlled with precision and consistency over the entire production run. The injection unit, on the other hand, must be capable of accommodating a variety of operating conditions, in terms of plastic materials composition, injection rates, and injection volumes.

It is also important that the injection unit as a whole be of a compact and simple design which offers the neccessary operational reliability and adjustability in combination with a high longevity. Such an injection unit is known from my U.S. Pat. No. 3,833,204, particularly as shown in FIG. 2 thereof. This prior art injection unit features two parallel guide rods which support the injection unit and which, in turn, have one extremity attached to a stationary component part of the die closing unit and the other extremity either supported on the machine base or extending from the die closing unit in a cantilever fashion. The two guide rods carry two supporting bridges in a tandem arrangement, one behind the other. The front supporting bridge carries a plastification cylinder in a parallel central relationship to the guide rods, and the rear supporting bridge carries a cooperating plastification screw which is rotatable and axially movable inside the plastification cylinder. The rotation of the plastification screw is produced by a hydraulic rotary drive which is likewise carried by the rear supporting bridge.

An operating cylce of the injection unit consists essentially of a plastification stroke and a subsequent injection stroke. During the plastification stroke, the plastification screw rotates, as granular raw material is being fed into the rear of the plastification cylinder, in the area where the latter is seated in the front supporting bridge. The forcible advance of the raw material by the plastification screw pushes the latter rearwardly, until the required quantity of raw material has accumulated in front of the plastification screw. At that point, the unit is ready for the injection stroke which consists of a forcible forward movement of the plastification screw inside the plastification cylinder, thereby injecting the plastified raw material into the injection molding die, through an injection nozzle at the forward extremity of the plastification cylinder.

Both supporting bridges form hydraulic cylinder assemblies where they surround the guide rods, for the control of the axial movements of the supporting bridges on the guide rods. A movement of the front supporting bridge produces a corresponding axial movement of the entire injection unit, including the plastification cylinder, thereby giving access to the nozzle of the latter and the sprue channel of the injection molding die. The axial movements of the rear supporting bridge produce movements of the plastification screw relative to the plastification cylinder. The movements are controlled by the cylinder assemblies of the rear supporting bridge, the pistons of these cylinder assemblies being hollow sleeve-like extensions of the front supporting bridge.

The hydraulic controls for such an injection unit are automated to the extent that they utilize control inputs of predetermined values in the form of electronic signals which produce continuous adjustments of the pressure and flow rate of the hydraulic fluid which is delivered to the cylinder assemblies, especially the cylinder assemblies of the rear supporting bridge of the above-described injection unit.

In order to obtain the desired adjustments in fluid pressure and flow rate, the electronic input signals are fed to a suitable proportional-response valve which, depending on its connections in the hydraulic control circuit, serves as a throttle valve controlling the fluid flow rate or as a bypass valve controlling the fluid pressure. Both types of proportional-response valves are known from the prior art. A practical application of a proportional-response flow control valve and a proportional-response pressure control valve in connection with an injection molding machine is disclosed in my U.S. Pat. No. 4,020,633.

It is also known from the prior art to equip an injection unit with hydraulic controls which include as their main control component a servo-valve which features pressure transducers in the hydraulic supply lines as part of an electronic feedback circuit and which receives its input signals from an electronic computer, for example. Systems of this type are known as process control systems and they are normally more complex and more expensive than control systems which utilize proportional-response valves with presettable input values. The electronic servo-valve circuit, on the other hand, compensates automatically for any pressure losses or leakages in the hydraulic controls, thanks to the feedback connection between the supply lines of the hydraulic drive assembly and the input signal generator. Its preferred application is therefore found in connection with injection molding machines and injection units which have to meet very high product quality standards. Detailed performance data of a machine with a servo-valve circuit are reported in the periodical "Plastverarbeiter", vol. 9, (pp. 475–479.)

SUMMARY OF THE INVENTION

It is a primary objective of the present invention to suggest improved hydraulic controls for an injection unit of the type described further above which, at minimal additional expense, make possible the interchangeable use of two different hydraulic control systems, one having presettable proportional-response control valves for the adjustment of the fluid pressure and flow rate, and the other having a process control circuit with an electronically controlled servo-valve and a feedback loop with pressure transducers.

The present invention proposes to attain this objective by suggesting, in connection with an injection unit which has tandem supporting bridges riding on two guide rods, hydraulic cylinder assemblies in the rear supporting bridge which feature interchangeable pistons which are mounted on sleeve-like piston rods attached to the front supporting bridge and matching rear cylinder covers, so that, in one assembly configuration, the pistons form the rearward extremities of the piston rods and the cylinder assemblies operate in the manner of single-acting cylinders, and in another assembly configuration, the pistons have rearwardly oriented piston rod extensions of a diameter which is larger than the diameter of the piston rods, and the associated rear cylinder covers have matching bores which sealingly surround the piston rod extensions, so that the cylinder assemblies operate in the manner of double-acting cylinders with differential pistons.

The first configuration of the cylinder assemblies is adapted for use with a hydraulic control circuit which features proportional-response control valves for the adjustment of the fluid pressure and fluid flow rate by means of presettable inputs to the control valves. The second configuration of the hydraulic cylinder assemblies is adapted for the connection of a hydraulic supply circuit which provides automatic process control by means of an electronically controlled servo-valve receiving its input signals from a computer, for example, which also takes into account the results of continuous pressure measurements in the pressure spaces of the hydraulic cylinder assemblies.

A preferred embodiment of this invention features two identical cylinder assemblies in the rear supporting bridge of the injection units, with hollow piston rods extending forwardly along the guide rods to the forward supporting bridge to which they are attached, the pistons being threaded onto the rear extremities of the hollow piston rods. While the pistons for the first assembly configuration are simple internally threaded rings, and their rear cylinder covers ride on the guide rods, the pistons for the second assembly configuration include, integrally attached thereto, the earlier-mentioned rear piston extensions which are slideable on the guide rods and which, in turn, serve as a sliding support for the rear cylinder covers which have correspondingly enlarged bores.

In a preferred embodiment, the invention further suggests that the connections of the two types of hydraulic supply circuits include flexible line portions and standardized hollow connectors attaching the latter either directly to the rear supporting bridge or to a distributor block which, in turn, is attached to the same connections on the rear supporting bridge. The distributor block would be used in the second assembly configuration, serving as a housing and/or support for the electronic servo-valve and its feedback pressure transducers, for example.

The proposed convertibility of the hydraulic cylinder assemblies for cooperation with two different hydraulic control systems makes it possible to meet different customer requirements, using a maximum of identical parts. The invention thus also makes it possible to readily convert a given injection unit from one hydraulic control mode to the other.

BRIEF DESCRIPTION OF THE DRAWINGS

Further special features and advantages of the invention will become apparent from the description following below, when taken together with the accompanying drawings, which illustrate, by way of example, a preferred embodiment of the invention which is represented in the various figures as follows.

DESCRIPTION OF THE PREFERRED EMBODIMENT

Figure 1:
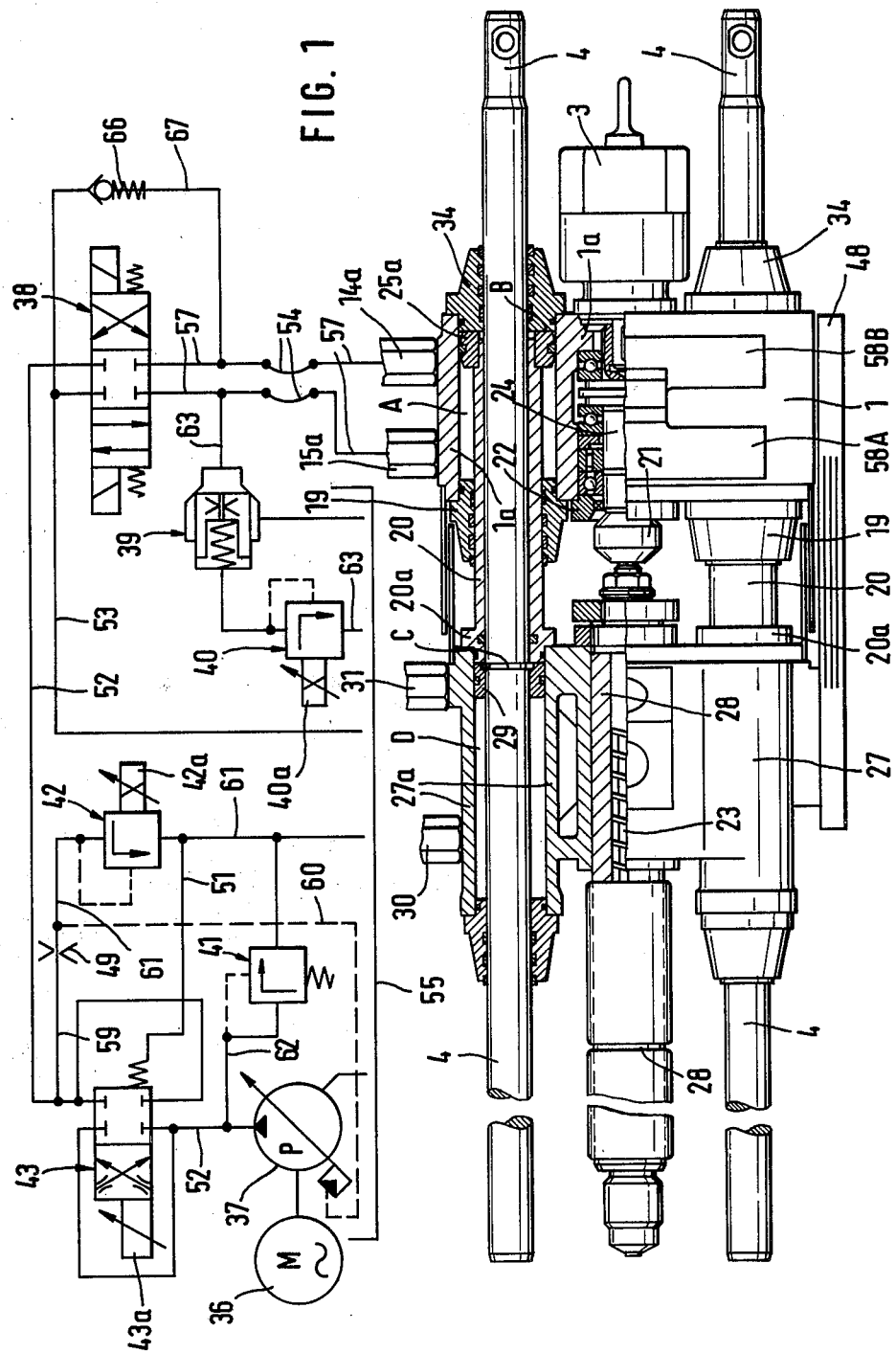
FIG. 1 shows an injection unit in a partially cross-sectioned plan view, including a circuity diagram of a hydraulic control system which utilizes presettable proportional-response control valves, in a first configuration of a preferred embodiment of the invention.
Figure 2:
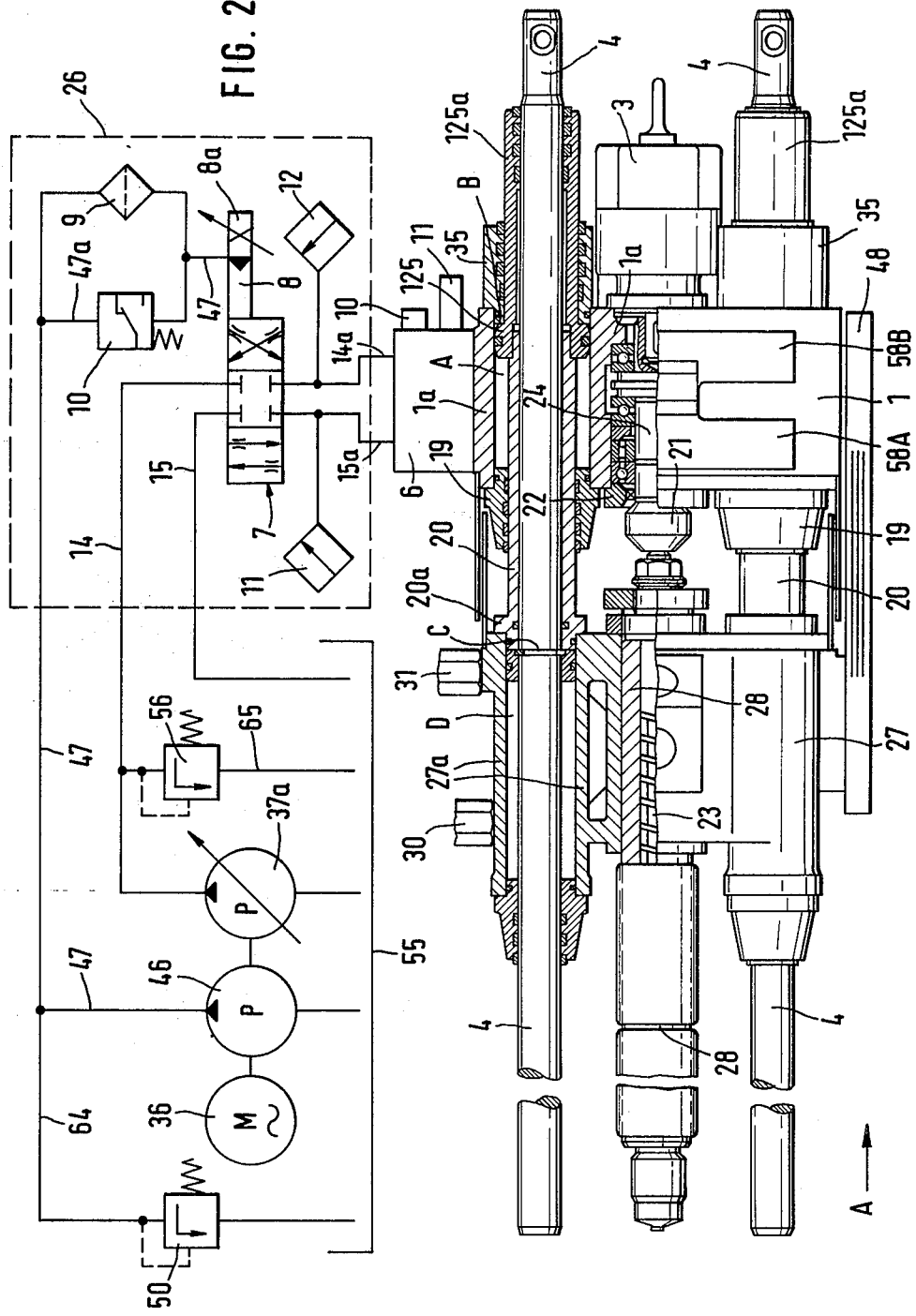
FIG. 2 shows the injection unit of FIG. 1 with a circuitry diagram of a hydraulic control system which utilizes an electronically adjusted servo-valve, in a second configuration of the preferred embodiment of the invention.

An embodiment of the present invention is shown in two different assembly configurations in FIG. 1 and FIG. 2 of the drawing, in connection with an injection unit of the type which rides on two parallel stationary guide rods 4. The forward extremities of the two guide rods 4 are fixedly attached to the die closing unit of an injection molding machine (not shown), and their rear extremities may be supported on the machine base (not shown), if the injection unit is arranged for horizontal injection. The guide rods 4 support two supporting bridges 27 and 1 in a tandem arrangement, for axial movements along the longitudinal axis of the unit, which is also the injection axis. The front supporting bridge 27 carries a plastification cylinder 28 whose rear end portion is engaged in a central bore of the bridge 27. It also carries a plastic raw material hopper (not shown) which feeds plastic granulate through a vertical chute into the rear portion of the plastification cylinder 28.

In the bore of the plastification cylinder 28 is arranged a plastification screw 23 which is rotatable and axially movable relative to the plastification cylinder 28, receiving its rotational movements from a hydraulic rotary drive 3 which is carried by the rear supporting bridge 1. A drive shaft 24 and a coupling 21 connect the rotary drive 3 to the plastification screw 23, so that the latter will execute the same axial movements as the supporting bridge 1. Appropriate thrust bearings, held in place by a bearing cover 22, form a clearance-free axial connection between the drive shaft 24 and the rear supporting bridge 1.

The two supporting bridges 27 and 1 are formed by similar castings, each having a central bore and two outer bores which concentrically surround the guide rods 4 so as to form annular spaces, as part of hydraulic cylinder assemblies. Thus, the front supporting bridge 27 has two cylinder bores 27a which, in cooperation with two fixed pistons 29 on the guide rods 4, form a first set of double-acting hydraulic cylinder assemblies. Two pressure supply lines 30 and 31 lead to pressure spaces D and C on opposite sides of the stationary pistons 29. Accordingly, it is possible to axially move the supporting bridge 27, and with it the entire injection unit, through pressurization of the pressure spaces C or D of the cylinder assemblies, thereby approaching or retracting the injection unit in relation to the injection molding die (not shown) of the injection molding machine.

The rear supporting bridge 1 features similar cylinder bores 1a which cooperate with matching pistons 25a.

The latter, however, are not seated on the guide rods 4, but on the rear extremities of sleeve-like hollow piston rods 20 which extend forwardly and have their forward extremities attached to the front supporting bridge 27. For this purpose, the piston rods 20 have on their forward extremities enlarged attachement flanges 20a. These flanges conveniently serve as rear cylinder covers for the cylinder asemblies of the front supporting bridge 27.

The pistons 25a of the rear cylinder assemblies are thus solidary with the front supporting bridge 27. It follows that a pressurization of the cylinder assemblies of the rear supporting bridge 1 produces a movement of this bridge away from, or towards, the front supporting bridge 27, thereby retracting the plastification screw 23 in a plastification stroke, or advancing the plastification screw 23 in an injection stroke, respectively. The cylinder bores 1a of the supporting bridge 1 form front and rear pressure spaces A and B, respectively, on opposite sides of the pistons 25a, the pressure spaces being delimited by front cylinder covers 19 and rear cylinder covers 34. These cylinder covers support and guide the rear supporting bridge 1, as the front covers 19 slide on the outer diameter of the piston rods 20 and the rear covers 34 slide on the guide rods 4.

As can further be seen in FIG. 1, the injection stroke of the plastification screw 23 is obtained through pressurization of the pressure spaces A of the cylinder assemblies in the rear supporting bridge 1. For this purpose, the pressure spaces A have connected thereto a hydraulic control system which is shown in the circuitry diagram of FIG. 1. There, it can be seen that the pressure for the injection stroke is supplied through the main supply line 52 which leads from a variable delivery pump 37 to a multiway valve 38 and, over supply branches 57 and flexible line portions 54, to the cylinder assemblies of the supporting bridge 1. The variable delivery pump 37 is driven by means of an electric motor 36.

The pressure and flow rate at which hydraulic fluid is supplied to the pressure spaces A can be adjusted by means of a proportional-response flow control valve 43 which is arranged in the main supply line 52 and which, in accordance with a given setting of a potentiometer controlling the proportional-force electromagnet 43a of the valve 43, throttles the fluid flow in the main supply line 52. The fluid pressure is adjusted by means of a proportional-response pressure control valve 42 which is arranged in a return branch 61 leading from the main supply line 52 to the fluid reservoir 55. The setting of the pressure control valve 42 is obtained by means of a proportional-force electromagnet 42a and a suitable potentiometer.

A leakage return line 51 links the flow control valve 43 to the return line 61, and a hydraulic feedback line 60 supplies an adjustment pressure to the variable delivery pump 37 from a point on the return line 61 which is located between an adjustable control diaphragm 49 and the pressure control valve 42. The potentiometers of the proportional-force electromagnets 42a and 43a, controlling the pressure control valve 42 and the flow control valve 43, are part of appropriate electronic circuits which permit a readjustment of the valves 42 and 43, whenever the pressure and flow rate values deviate from the desired magnitudes. A pressure relief valve 41 in an overflow return branch 62, just upstream of the variable delivery pump 37, protects the latter in the event of a hydraulic blockage in the system. In the drawing, the proportional-response flow control valve 43 and the multiway valve 38 are shown in their rest positions.

For the injection stroke of the injection unit, the multiway valve 38 is in its left-hand position, so that pressurized fluid will flow into the pressure space A of the cylinder bores 1a. During the subsequent plastification stroke, the rotating plastification screw 23 creates a plastification pressure which causes the screw 23 to back up, pushing the supporting bridge 1 rearwardly and displacing fluid from the pressure space A. This displaced fluid passes from the supply branch 57 to a reverse flow branch 63, where a predetermined resistance in the form of a counterpressure is created by means of a cartridge valve 39 which serves as a counterpressure throttle valve and is controlled by means of a proportional response counter-pressure valve 40. The setting of the latter is controlled by means of an electromagnet 40a. A resistance-free return flow is obtainable in the right-hand position of the multiway valve 38, which allows the displaced fluid to pass freely from the supply branch 57 to the return line 53 which leads to the fluid reservoir 55. A bypass branch 67 with a check valve 66 bridges the multiway valve 38, linking one of the supply branches 57 to the return line 53.

A second configuration of the embodiment of the present invention is shown in FIG. 2, where it can be seen that the mechanical components of the injection unit remain unchanged, with the exception of the pistons and the rear cylinder covers of the hydraulic cylinder assemblies of the rear supporting bridge 1. The simple annular pistons 25a of the cylinder configuration of FIG. 1 have been replaced by pistons 125 which form rearwardly oriented piston rod extensions 125a. The latter reach axially through the rear cylinder covers 35 which have correspondingly enlarged central guide bores.

The conversion from one assembly configuration to the other is made very simple through the arrangement of a threaded connection between the interchangeable piston 25a or 125 and the piston rod 20. An externally threaded end portion of the latter is engaged by a matching internal thread of the interchangeable piston. In order to exchange one piston for the other, it is only necessary to remove the rear cover of the cylinder assembly and to unscrew the piston from the piston rod 20, replacing it with the other piston, and replacing the previous rear cylinder cover with a matching new cover.

In the hydraulic cylinder assembly configuration of FIG. 2, the piston rod extensions 125a of the pistons 125 have a diameter which is larger than the diameter of the piston rods 20. The result is a double-acting cylinder assembly which has a differential piston, the forward pressure space A of the assembly having a larger effective cross-sectional area than the rearward pressure space B. The hydraulic cylinder configuration of FIG. 1, in contrast, operates as a single-acting cylinder, as only the cylinder space A is pressurized during the injection stroke.

The hydraulic cylinder configuration of FIG. 2 is adapted for connection to a hydraulic control system which features an electronic servo-valve, as is shown in the circuitry diagram of FIG. 2. The servo-valve and several associated components are integrated into, or attached to, a distributor block 6 which is shown in more detail in FIGS. 3–5.

The operative components of this so-called process control system are as follows: The power for the system is supplied by means of an electric motor 36 which drives a constant pressure pump 46 and a variable delivery pump 37a. A pressure line 47 connects the constant pressure pump 46 to a fluid pressure booster 8 of the servo-valve. An overflow return branch 64 with a pressure control valve 50 limits the level of pressure which is produced by the constant pressure pump 46. The variable delivery pump 37a delivers hydraulic fluid to the servo-valve 7, via the pressure supply line 14. The servo-valve 7, in turn, is connected to the pressure spaces A and B of the cylinder bores 1a. Tapping these connections are two pressure transducers 11 and 12 which thus continuously measure the hydraulic pressure in the pressure spaces A and B, respectively, producing a correspondingly changing output voltage.

The fluid pressure booster 8 receives an electronic input from an input signal generator 8a which, together with the pressure transducers 11 and 12, forms an electronic feedback loop. The input signal generator 8a may be connected to a programmable computer, for example. The electronic feedback loop makes it possible to continuously compensate for any leakage or pressure losses in the fluid supply to the cylinder assemblies.

In the pressure line 47 is further arranged a microfilter 9 which is controlled by a differential-pressure switch 10. The latter is arranged in a parallel branch 47a. A return line 15 leads from the servo-valve 7 to the fluid reservoir 55. The variable delivery pump 37a is protected by a pressure relief valve 56 which is arranged in a return branch 65 of the pressure line 14.

The servo-valve 7, its fluid pressure booster 8, and the pressure transducers 11 and 12, as well as the microfilter 9 and the associated differential-pressure switch 10, are combined in a servo-valve assembly which, as shown in FIGS. 2–5, is conveniently accommodated on the outside of the rear supporting bridge 1, in the form of a compact component cluster which is carried by a distributor block 6. The latter is removably attached to a lateral face of the supporting bridge 1, using the same connecting bores as are used for the hydraulic control system of FIG. 1.

Figure 3:
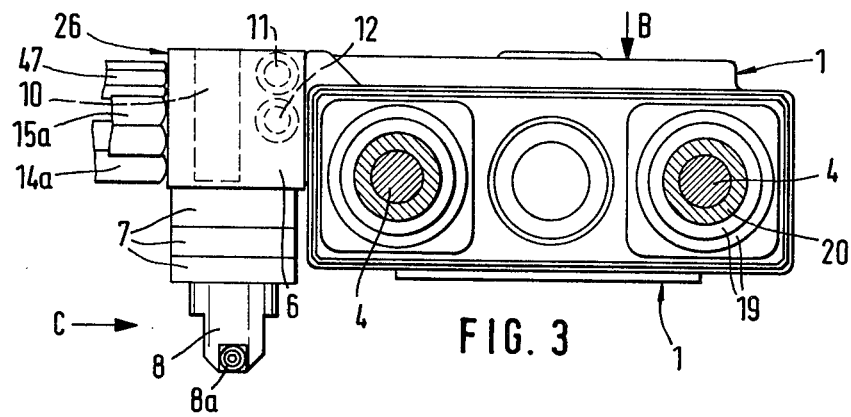
FIG. 3 is a transverse elevational cross section through the injection unit of FIG. 2, showing the rear supporting bridge and an attached servo-valve assembly.
Figure 4:
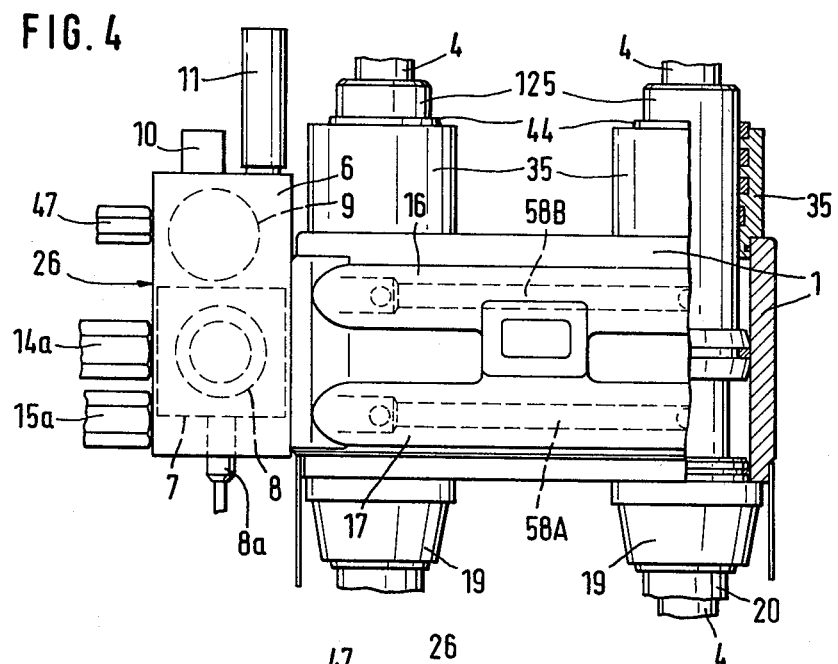
FIG. 4 shows the rear supporting bridge of FIG. 3 in a plan view (arrow B in FIG. 1)
Figure 5:
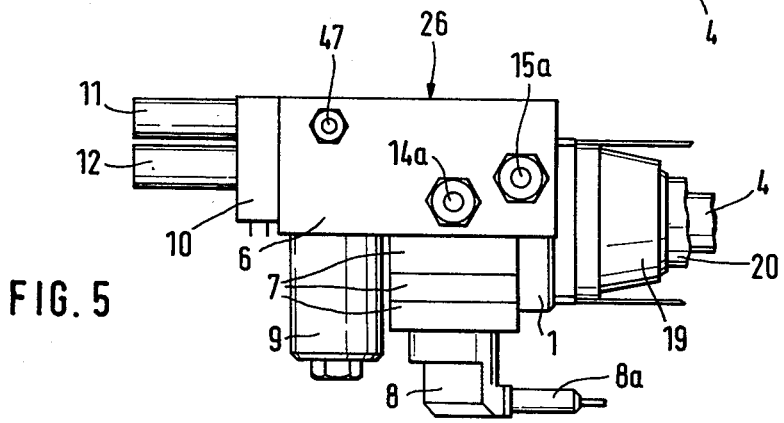
FIG. 5 shows the rear supporting bridge of FIGS. 3 and 4 in a side view (arrow C in FIG. 1)
Figure 6:
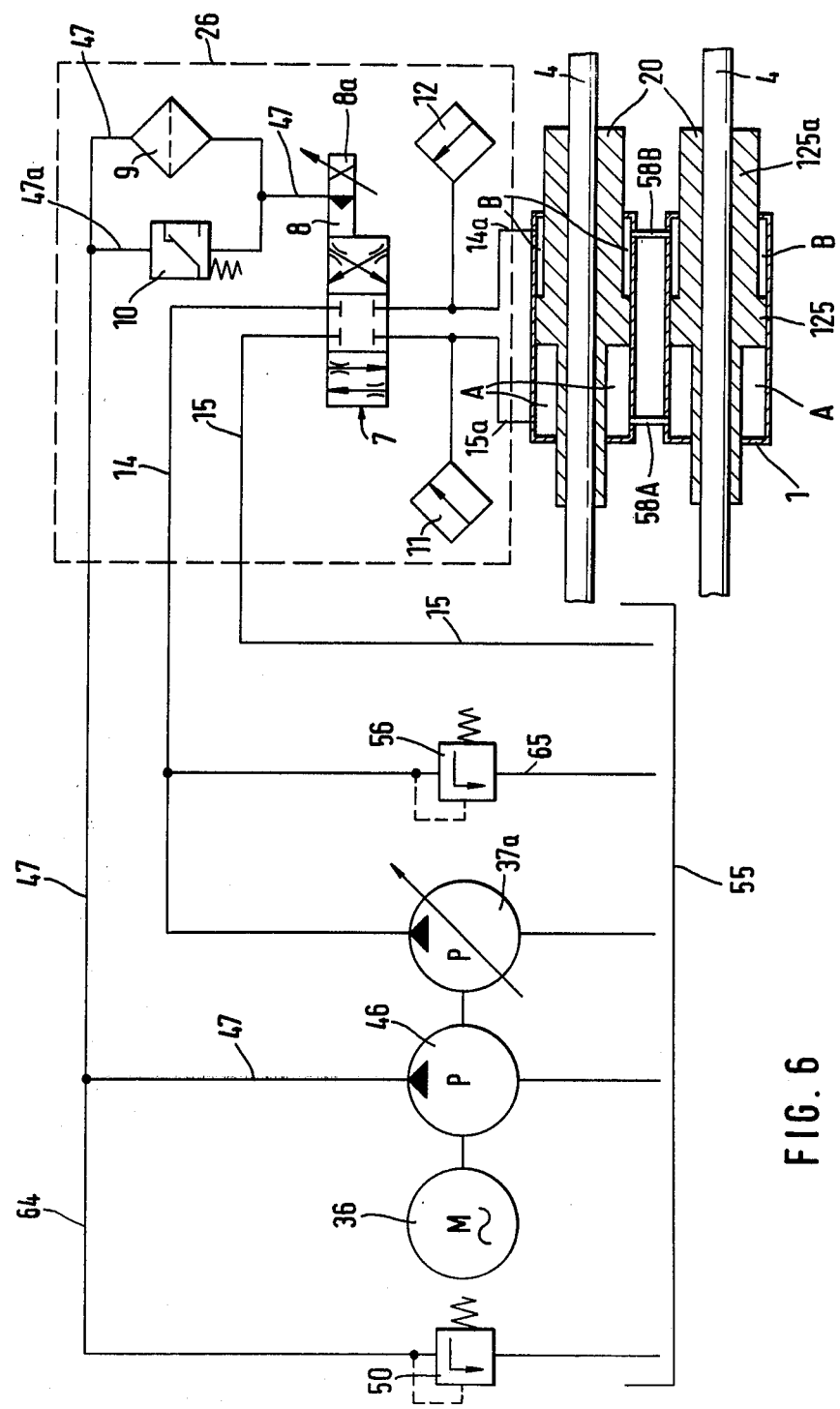
FIG. 6 shows the hydraulic circuitry diagram for the servo-valve control system which is shown in FIGS. 2–5.

The servo-valve assembly 26, shown in more detail in FIGS. 3–5, consists essentially of a rectangular distributor block 6 which is clamped to a planar lateral face of the rear supporting bridge 1, carrying on its bottom side the vertically oriented electronic servo-valve 7 and the micro-filter 9. The two pressure transducers 11 and 12 are arranged one above the other on a vertical rear face of the distributor block 6, and the same face also carries the differential-pressure switch 10.

To the outer lateral face of the distributor block 6 are connected the pressure supply line 14 and the return line 15, using the same line connectors 14a and 15a as are used for the supply branches 57 of the hydraulic system of FIG. 1 which relies on proportional-response control valves. Also connected to the outer lateral face of the distributor block 6 is the pressure line 47 which links the fluid pressure booster 8 to the constant-pressure pump 46. The entire servo-valve assembly 26 is readily removable from the supporting bridge 1 and, in its place, the line connectors 14a and 15a of the supply branches 57 (FIG. 1) can be attached directly to the lateral mounting face of the supporting bridge 1.

The front and rear pressure spaces A and B of the two cylinder bores 1a of the rear supporting bridge 1 are transversely interconnected by means of connecting bores 58A and 58B which are accommodated inside two upwardly protruding transverse ribs 17 and 16, respectively. This places the connecting bores 58A and 58B above the central bore which houses the bearings for the drive shaft 24.

The injection unit further includes a displacement measuring device 48 which is arranged on the opposite lateral side of the two supporting bridges 27 and 1 and which measures the relative displacements between the two supporting bridges. Adjustable displacement-triggered end switches are used to control the timing and length of the injection stroke of the plastification screw 23.

It should be understood, of course, that the foregoing disclosure describes only a preferred embodiment of the invention and that it is intended to cover all changes and modifications of this example of the invention which fall within the scope of the appended claims:

I claim the following:

1. Hydraulic controls for the injection unit of an injection molding machine processing plastic raw materials, which injection unit has a plastification cylinder defining an injection axis and a cooperating plastification screw reaching into the plastification cylinder from behind, including means for rotating the plastification screw in a plastificaton stroke and means for axially advancing it in an injection stroke, the hydraulic controls for said injection unit being associated with the means for advancing the plastification screw and comprising:

a hydraulic cylinder assembly of which the cylinder cavity is formed by a bore in a movable member which is connected to the plastification screw for axial movements therewith, and of which the piston is connected to the plastification cylinder by means of a piston rod extending forwardly from the cylinder assembly, so that pressurization of the cylinder space forward of the piston produces an injection stroke of the plastification screw; and wherein the cylinder assembly is convertible so that, in a first assembly configuration, the piston forms the rearward extremity of the piston rod and the cylinder assembly operates in the manner of a single-acting cylinder, suitable for the connection thereto of a hydraulic supply circuit which has presettable proportional-response control valves for the adjustment of the fluid pressure and flow rate which determine the injection stroke and return movement of the plastification screw, and so that, in a second assembly configuration, the piston is adjoined by a rearwardly oriented piston rod extension of a diameter larger than the diameter of the piston rod, and the associated rear cylinder cover has a matching bore forming a seal with the piston rod extension, whereby the cylinder assembly operates in the manner of a double-acting cylinder of the differential-piston type, suitable for the connection thereto of a hydraulic supply circuit which includes an electronically controlled servo-valve receiving electronic input signals from a signal generator which receives feedback signals from pressure transducers measuring the fluid pressure on both sides of the piston.

2. Hydraulic injection unit controls as defined in claim 1, wherein the piston of the cylinder assembly is removably attached to the rear extremity of the piston rod by means of a threaded connection;

the piston rod extension of the second cylinder assembly configuration is attached to the adjoining piston; and the rear cylinder cover of the second cylinder assembly configuration cooperates with the piston rod extension in such a way that the cylinder assembly and the movable member of which the assembly is apart are guidingly supported on the piston rod extension.

3. Hydraulic injection unit controls as defined in claim 1 or claim 2, wherein the hydraulic cylinder assembly is arranged in said first assembly configuration, and, to the cylinder assembly is connected a hydraulic control circuit which includes:

a variable delivery hydraulic pump driven by an electric motor and adjustable in output by means of a pump control member, the pump having an inlet connected to a fluid reservoir;

a main supply line connecting the outlet of the pump to the cylinder assembly;

a proportional-response flow control valve in the main supply line, the setting of the valve being adjustable by means of a proportional-force electromagnet which moves in response to an electronic control signal imposed on it by a presettable signal source;

a return branch leading from a point on the main supply line downstream of said flow control valve to the fluid reservoir, the return branch including an adjustable control diaphragm;

a proportional-response pressure control valve in the return branch, the setting of the valve being adjustable by means of a proportional-force electromagnet which moves in response to an electronic control signal imposed on it by a presettable signal source;

a hydraulic feedback line leading from a point on the return branch between the diaphragm and the pressure control valve to the control member of the pump;

a return line connecting the cylinder assembly to the fluid reservoir;

a multiway valve simultaneously controlling the main supply line and the return line so as to selectively block both lines and to alternatively connect one of the two lines to a supply branch leading to the front side of the hydraulic cylinder and the other line to a supply branch leading to the rear side thereof; and a reverse flow branch leading from said front side supply branch to the fluid reservoir and having in it a counterpressure throttle valve controlled by means of a proportional-response counterpressure valve which is presettable like said other proportional-response valves.

4. Hydraulic injection unit controls as defined in claim 1 or claim 2, wherein the hydraulic cylinder assembly is arranged in said second assembly configuration, and, to the cylinder assembly is connected a hydraulic control circuit which includes:

a variable delivery hydraulic pump and a constant-pressure pump, both being driven by an electric motor and having their inlets connected to a fluid reservoir;

a pressure supply line leading from the outlet side of the variable delivery pump to the hydraulic cylinder;

a return line leading from the hydraulic cylinder to the fluid reservoir;

an electronic servo-valve simultaneously controlling the pressure supply line and the return line so as to selectively block both lines and to alternatively connect one of the two lines to a supply branch leading to the front side of the hydraulic cylinder and the other line to a supply branch leading to the rear side thereof, the servo-valve including a fluid pressure booster which is connected to the outlet side of the constant-pressure pump and an electronic signal generator controlling the pressure booster, so as to adjust the hydraulic pressure and flow rate in at least one of the two supply branches in response to a predetermined electronic signal program, the servo-valve further including pressure transducers in the two supply branches as part of an electronic feedback loop which continuously supplies pressure information to the electronic signal generator.

5. Hydraulic injection unit controls as defined in claim 4, wherein the hydraulic control system further includes a distributor block which is removably attached to the hydraulic cylinder assembly and which incorporates the two supply branches leading to the front and rear sides of the hydraulic cylinder;

the electronic servo-valve is mounted on the outside of, and supported by, the distributor block, forming a rigid assembly therewith; and the pressure transducers in the two supply branches are likewise arranged on the outside of the distributor block, reaching the supply branches through connecting bores in the distributor block.

6. Hydraulic injection unit controls as defined in claim 5, wherein the hydraulic control circuit further includes a line connecting the constant-pressure pump to the pressure booster and, in said line, a filter and a parallel-connected differential-pressure swtich, both being incorporated in the distributor block.

7. Hydraulic injection unit controls as defined in claim 5, wherein the hydraulic cylinder assembly comprises two parallel-aligned cylinders, as part of a transversely oriented supporting bridge which is guided for axial movements on two parallel stationary guide rods extending in the two cylinder axes;

the two cylinders are hydraulically interconnected by means of two internal transverse channels; and the distributor block carrying the electronic servo-valve is attached to a lateral mounting face of the supporting bridge.

* * * * *

UNITED STATES PATENT AND TRADEMARK OFFICE
CERTIFICATE OF CORRECTION

PATENT NO. : 4,293,229
DATED : October 6, 1981
INVENTOR(S) : Karl HEHL

It is certified that error appears in the above-identified patent and that said Letters Patent are hereby corrected as shown below:

Claim 2:

In line 11 (column 9) "apart" should read --a part--.

Claim 6:

In line 49 (column 10) "swtich" should read --switch--.

Signed and Sealed this

Twenty-fourth Day of August 1982

[SEAL]

Attest:

GERALD J. MOSSINGHOFF

*Attesting Officer*     *Commissioner of Patents and Trademarks*